US011698320B2

(12) United States Patent
Meng

(10) Patent No.: US 11,698,320 B2
(45) Date of Patent: Jul. 11, 2023

(54) ROTOR BALANCING METHOD AND APPARATUS

(71) Applicant: Siemens Energy Global GmbH & Co. KG, Munich (DE)

(72) Inventor: Zhiqiang Meng, Loughborough (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 219 days.

(21) Appl. No.: 17/048,579

(22) PCT Filed: Apr. 18, 2019

(86) PCT No.: PCT/EP2019/060084
§ 371 (c)(1),
(2) Date: Oct. 17, 2020

(87) PCT Pub. No.: WO2019/214923
PCT Pub. Date: Nov. 14, 2019

(65) Prior Publication Data
US 2021/0156757 A1 May 27, 2021

(30) Foreign Application Priority Data

May 9, 2018 (EP) .................................... 18171632

(51) Int. Cl.
*G01M 1/32* (2006.01)
*G01M 1/02* (2006.01)
(Continued)

(52) U.S. Cl.
CPC ................ *G01M 1/32* (2013.01); *G01M 1/02* (2013.01); *G01M 1/22* (2013.01); *G06F 17/11* (2013.01);
(Continued)

(58) Field of Classification Search
CPC ............. G01M 1/04; G01M 1/16; G01M 1/32
See application file for complete search history.

(56) References Cited

U.S. PATENT DOCUMENTS 5,214,585 A    5/1993   Ehrich
2005/0065712 A1*   3/2005   Skilton .................. F01D 5/027
701/124
(Continued)

FOREIGN PATENT DOCUMENTS

CN         105823599 A    8/2016
RU         2176783 C1    12/2001
(Continued)

OTHER PUBLICATIONS

Kelm Ray et al: "Texas A&M Turbomachinery Laboratory projects", Turbomachinery International, pp. 16, XP055522350, Norwalk Retrieved from the Internet:bURL:http://oaktrust.library.tamu.edu/bitstream/handle/1969.1/159803/05 Pavelek.pdf?s; equence=1; [retrieved on Nov. 12, 2018] p. 6, paragraph 5-8, paragraph 4, p. 15, paragraph 3-p. 17, paragraph 3; fig. 9; 2016.
Foiles W C et al: "Review: Rotor Balancing", Shock and Vibration, vol. 5, No. 5-6, pp. 325-336, XP055522352, NL, ISSN: 1070-9622, DOI: 10.1155/1998/648518, the whole document; 1998.
(Continued)

*Primary Examiner* — Alexander A Mercado
(74) *Attorney, Agent, or Firm* — Wolter Van Dyke Davis, PLLC

(57) ABSTRACT

A rotor balancing method for a gas turbine on a balancing machine, includes performing a base run by running the rotor at an intended balance speed and measuring the vibrations at a first pedestal; carrying out partial balancing; performing a first influence run by fitting a first balancing weight to a first correction plane in order to reduce vibrations at the first pedestal; performing a second influence run by fitting a first calibration weight to a second correction plane, running the rotor at the intended balance speed and measuring the vibrations at the first pedestal and the second pedestal, and removing the first calibration weight; and
(Continued)

carrying out final balancing of the rotor by fitting a final balancing weight to the first correction plane and a second balancing weight to the second correction plane dependent on vibrations measured as part of the first influence run and the second influence run.

11 Claims, 4 Drawing Sheets

(51) Int. Cl.
*G01M 1/22* (2006.01)
*G06F 17/16* (2006.01)
*G06F 17/18* (2006.01)
*G06F 17/11* (2006.01)
*G01M 15/14* (2006.01)

(52) U.S. Cl.
CPC .............. *G06F 17/16* (2013.01); *G06F 17/18* (2013.01); *G01M 15/14* (2013.01)

(56) References Cited

U.S. PATENT DOCUMENTS

| | | | |
|---|---|---|---|
| 2013/0340521 A1* | 12/2013 | Clark | F01D 5/26 73/462 |
| 2015/0128698 A1 | 5/2015 | Sinkhorn | |
| 2016/0169765 A1 | 6/2016 | Panicker et al. | |
| 2017/0254715 A1* | 9/2017 | Rix | G01M 1/34 |
| 2018/0354646 A1* | 12/2018 | Nakhjavani | G01M 15/14 |

FOREIGN PATENT DOCUMENTS

| | | |
|---|---|---|
| RU | 2499985 C1 | 11/2013 |
| RU | 2694142 C1 | 7/2019 |

OTHER PUBLICATIONS

PCT International Search Report and Written Opinion of International Searching Authority dated Aug. 1, 2019 corresponding to PCT International Application No. PCT/EP2019/060084 filed Apr. 18, 2019.

\* cited by examiner

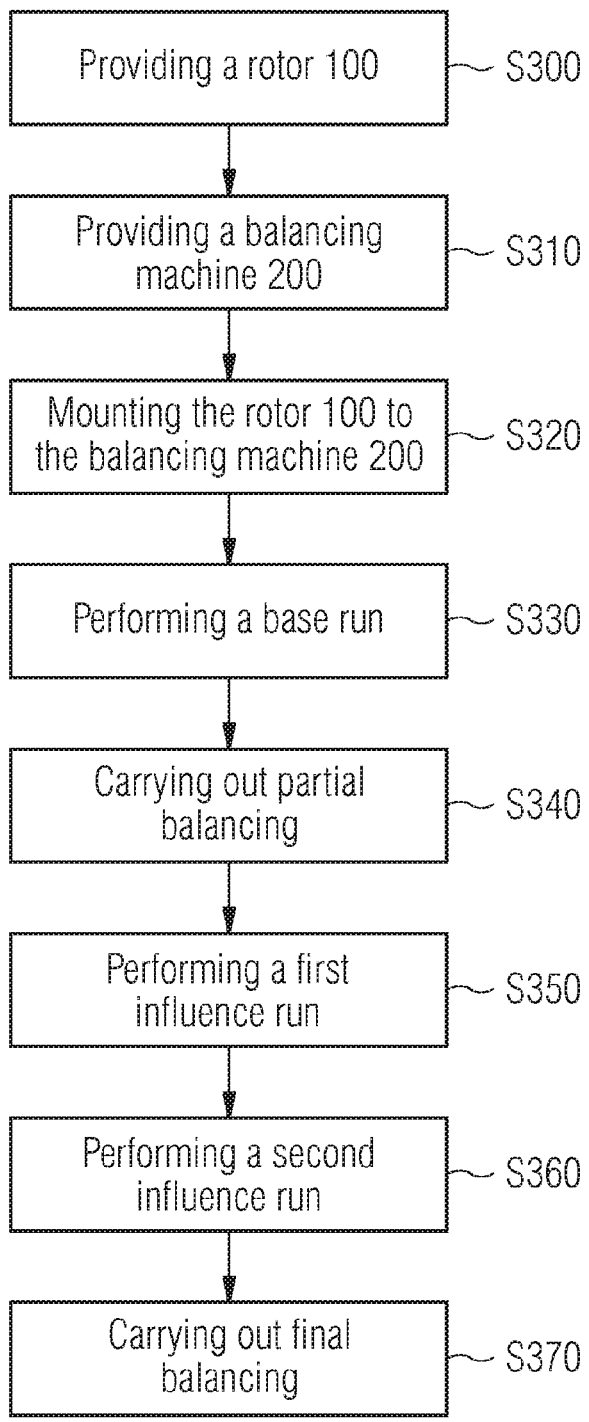

US 11,698,320 B2

ROTOR BALANCING METHOD AND APPARATUS

CROSS REFERENCE TO RELATED APPLICATIONS

This application is the US National Stage of International Application No. PCT/EP2019/060084 filed 18 Apr. 2019, and claims the benefit thereof. The International Application claims the benefit of European Application No. EP18171632 filed 9 May 2018. All of the applications are incorporated by reference herein in their entirety.

FIELD OF INVENTION

The present disclosure relates to gas turbine engines.
In particular the disclosure is concerned with a method of balancing a rotor for a gas turbine engine and an apparatus for balancing a rotor.

BACKGROUND

Gas turbine engines, which are a specific example of turbomachines, generally include a rotor with a number of rows of rotating rotor blades which are fixed to a rotor shaft. When a hot and pressurized working fluid flows through the rows of blades in the main passage of a gas turbine, it transfers momentum to the rotor blades and thus imparts a rotary motion to the rotor. As a result of any unbalance of the rotor, vibrations are caused which may adversely affect efficiency and durability of the gas turbine. Satisfactory operation therefore requires accurate balancing of the rotor to suppress vibrations. To this end, the rotor undergoes a balancing procedure by which unbalance is assessed and balancing weights fitted to the rotor.

A known procedure for balancing may comprise mounting the assembled rotor onto a balancing machine, running the rotor at the intended balancing speed and measuring the vibrations of the rotor as part of a so called base run. Subsequently a calibration weight is temporarily fitted to one of the available correction planes included in the rotor design. The rotor is again subjected to rotation and vibrations are measured with the calibration weight in place. This so-called influence run is performed for each available correction plane separately to assess its vibration response. Based on a comparison with the base run, correction weights are fitted. The balancing weights are fitted to reduce the unbalance of the rotor and therefore generally differ from the balancing weights in terms of both mass and angular location.

It has been found that certain types of rotors, which may be referred to as 'insensitive rotors', are more difficult to balance using the known procedure. That is to say, while certain conventional rotors may be balanced by performing, say, four or five runs in the balancing machine, for insensitive rotors a significantly greater number of runs may be required in order to meet an applicable balancing standard. In certain cases an insensitive rotor requires more than 10 runs for balancing, resulting in at least an additional work day in comparison to a sensitive rotor.

Hence a rotor balancing method improving on the number of iterations needed for balancing over conventional methods is highly desirable.

SUMMARY

According to the present disclosure there is provided a method, a computer-readable medium and a balancing machine as set forth in the appended claims. Other features of the invention will be apparent from the dependent claims, and the description which follows.

Accordingly there may be provided a rotor balancing method for a gas turbine, the method comprising: providing a rotor (100) comprising: a first bearing (140) and a second bearing (142), and a plurality of correction planes (150) comprising a first correction plane (152) and a second correction plane (154). The method further comprises mounting the rotor (100) for balancing by receiving the first bearing (140) on a first pedestal (212) and the second bearing (142) on a second pedestal (214). The method further comprises performing a base run by: running the rotor (100) at an intended balance speed and measuring the vibrations at the first pedestal (212). The method further comprises carrying out partial balancing and a first influence run of the rotor (100) by: fitting a first balancing weight (W1) to the first correction plane (152) in order to reduce vibrations at the first pedestal (212). The method further comprises performing a first influence run by: running the rotor (100) at the intended balance speed and measuring the vibrations at the first pedestal (212) and the second pedestal (214), leaving the first balancing weight (W1) fitted for all following influence runs. The method further comprises performing a second influence run by: fitting a first calibration weight (M1) to the second correction plane (154), running the rotor (100) at the intended balance speed and measuring the vibrations at the first pedestal (212) and the second pedestal (214), and removing the first calibration weight (M1). The method further comprises carrying out final balancing of the rotor (100) by: fitting a final balancing weight (W1') to the first correction plane (152) and a second balancing weight (W2) to the second correction plane (154) dependent on the vibrations measured as part of the first influence run and the second influence run. The exemplary method may provide for an improved method by which rotors can be balanced and, in particular, by which insensitive rotors may be balanceable more efficiently.

According to some examples, the final balancing weight (W1') is fitted to the first correction plane (152) in addition to the first balancing weight (W1). By fitting the final balancing weight (W1) to the first correction plane (152) in addition to the first balancing weight (W1'), the balancing procedure may be performed more quickly and with better results.

According to some examples, the final balancing weight (W1') is fitted to the first correction plane (152) and the first balancing weight (W1) is removed from the from the first correction plane (152) as part of the final balancing of the rotor (100). By removing the first balancing weight (W1), it is possible to use a single balancing weight, i.e. the final balancing weight (W1'), where otherwise two balancing weights would be fitted and obtain the same vibration reductions.

According to some examples, the method comprises: providing a data set containing: reference vibration measurements taken during balancing of at least one reference rotor (100) of the same production type as the rotor (100), or at least a first reference influence vector of the first correction plane (152), wherein the reference influence vector is an influence vector of the first correction plane (152) of a reference rotor (100) of the same production type as the rotor (100). By providing the data set with reference vibration measurements of the at least one reference rotor, available data from earlier balancing is used for time-efficiently balancing the rotor (100). For a correction plane of the rotor (100), particularly for a sensitive correction plane, a reference influence vector of a rotor of the same production type may be a suitable approximation of the actual influence vector, thus being used for determining the first balancing weight (W1) and its angular position of the first correction plane.

According to some examples, fitting the first balancing weight (W1) comprises using the data set to determine a mass and an angular position of the first balancing weight (W1) to reduce vibrations at the first pedestal (212). By determining the mass and the angular position of the first balancing weight using the available data, it may be possible to efficiently install the first balancing weight in order to significantly reduce vibrations at the first pedestal (212).

According to some examples, the magnitude of the first reference influence vector is greater than the magnitude of a second reference influence vector of the second correction plane (154), wherein the second reference influence vector is an influence vector of the second correction plane (154) of the reference rotor (100), and wherein the second reference influence vector is either contained in the data set or computable from the vibration measurements of the data set. Where the magnitude of the influence vectors differs greatly this may indicate that the smaller influence vector describes an insensitive correction plane. Accordingly the balancing method may be improved by recognising and efficiently using a sensitive correction plane for partial balancing, and both a sensitive and an insensitive correction plane for final (or 'residual') balancing.

According to some examples, the data set contains reference influence vectors of a first correction plane (152) and a second correction plane (154) of a plurality of reference rotors (100); and wherein the method comprises selecting the first pedestal (212) of the rotor (100) for partial balancing after determining that a phase of the reference influence vectors of the first correction plane (152) of the reference rotors (100) has a smaller statistical spread than a phase of the reference influence vectors of the second correction plane (154) of the reference rotors (100). From the determination that the influence vectors of a particular correction plane have a greater phase spread with respect to a particular pedestal, it may be inferable that this particular pedestal is more difficultly balanced using the particular correction plane. The results of partial balancing may therefore be improved by selecting accordingly.

According to some examples, the data set contains reference influence vectors of a second correction plane (154) of a plurality of reference rotors (100); and wherein the method comprises selecting the first pedestal (212) of the rotor (100) for partial balancing after determining that a phase of the reference influence vectors of the second correction plane (154) of the reference rotors (100) with respect to the first pedestal (212) has a greater statistical spread than a phase of the reference influence vectors of the second correction plane (154) with respect to the second pedestal (214) of the reference rotors (100).

According to some examples, the data set contains a plurality of reference influence vectors of the second correction plane (154), wherein the reference influence vectors are influence vectors of a plurality of reference rotors (100); and wherein the method comprises selecting the first pedestal (212) of the rotor (100) for partial balancing by: determining that the phase of the reference influence vectors of the first pedestals (212) of the reference rotors (100) has a statistical spread which is approximately equal to the statistical spread of the phase of the reference influence vectors of the second pedestals (214) of the reference rotors (100), and determining that greater vibrations are detected at the first pedestal (212) than at the second pedestal (214) as part of the vibration measurements of the base run of the rotor (100). Where it has been determined that both pedestals are approximately equally difficult to balance, based on the technical information that the phase spread is about equal, it may be desirable to perform partial balancing at the pedestal subjected to the greater vibrations. Thereby the results of partial balancing may be improved, as the greater vibrations will require a heavier balancing weight. In turn, the heaver balancing weight will mean reduced dependence on the accuracy of the angular location, i.e. phase.

According to some examples, fitting a first balancing weight (W1) comprises calculating an average influence vector from the reference influence vectors of the first correction plane (152) for determining the mass and the angular location of the first balancing weight (W1). Using an average influence vector may improve the approximation of a quantity describing the rotor (100) by using a quantity describing the reference rotors (100).

According to some examples, the method comprises: performing a third influence run, subsequent to the second influence run, by: fitting a second calibration weight (M2) to the third correction plane (156), running the rotor (100) at the intended balance speed and measuring the vibrations at the first pedestal (212) and/or the second pedestal (214), and removing the second calibration weight (M2); and wherein fitting the final balancing weight (W1') and the second balancing weight (W2) as part of carrying out final balancing of the rotor (100) also comprises: fitting a third balancing weight (W3) to the third correction plane (156) dependent on vibrations measured as part of the base run and the third influence run. By fitting a third balancing weight the overall balancing results may be improved.

According to some examples, the intended balance speed is a full operational speed at or around a critical speed of the rotor at which a mode shape of the rotor becomes significant for balancing considerations. For example, the rotor may be subjected to a rotational speed at or around the first critical speed of the rotor (100) at which the first bending mode of the rotor becomes significant for balancing considerations.

According to another example there may be provided a computer-readable medium containing: instructions for carrying out the method of the present disclosure.

According to some examples, the computer-readable medium contains the data set as described above. By providing the data set on the computer-readable medium a balancing solution may be provided which is both convenient for a user and implement for efficient execution.

According to some examples, the computer-readable medium is configured to instruct a processing unit to calculate the mass and the angular location of the first balancing weight (W1) using the data set. This may improve the user convenience, the efficiency and the accuracy of the placement of the weights.

According to another example there may be provided a balancing machine (200) comprising the computer-readable medium as described above, wherein the balancing machine (200) comprises the first pedestal (212) and the second pedestal (214).

BRIEF DESCRIPTION OF THE DRAWINGS

Examples of the present disclosure will now be described with reference to the accompanying drawings, in which:

FIG. 4 illustrates a rotor balancing method according to the present disclosure.

DETAILED DESCRIPTION

The present disclosure relates to a method for balancing a rotor for use in a turbomachine, such as a gas turbine.

Figure 1:
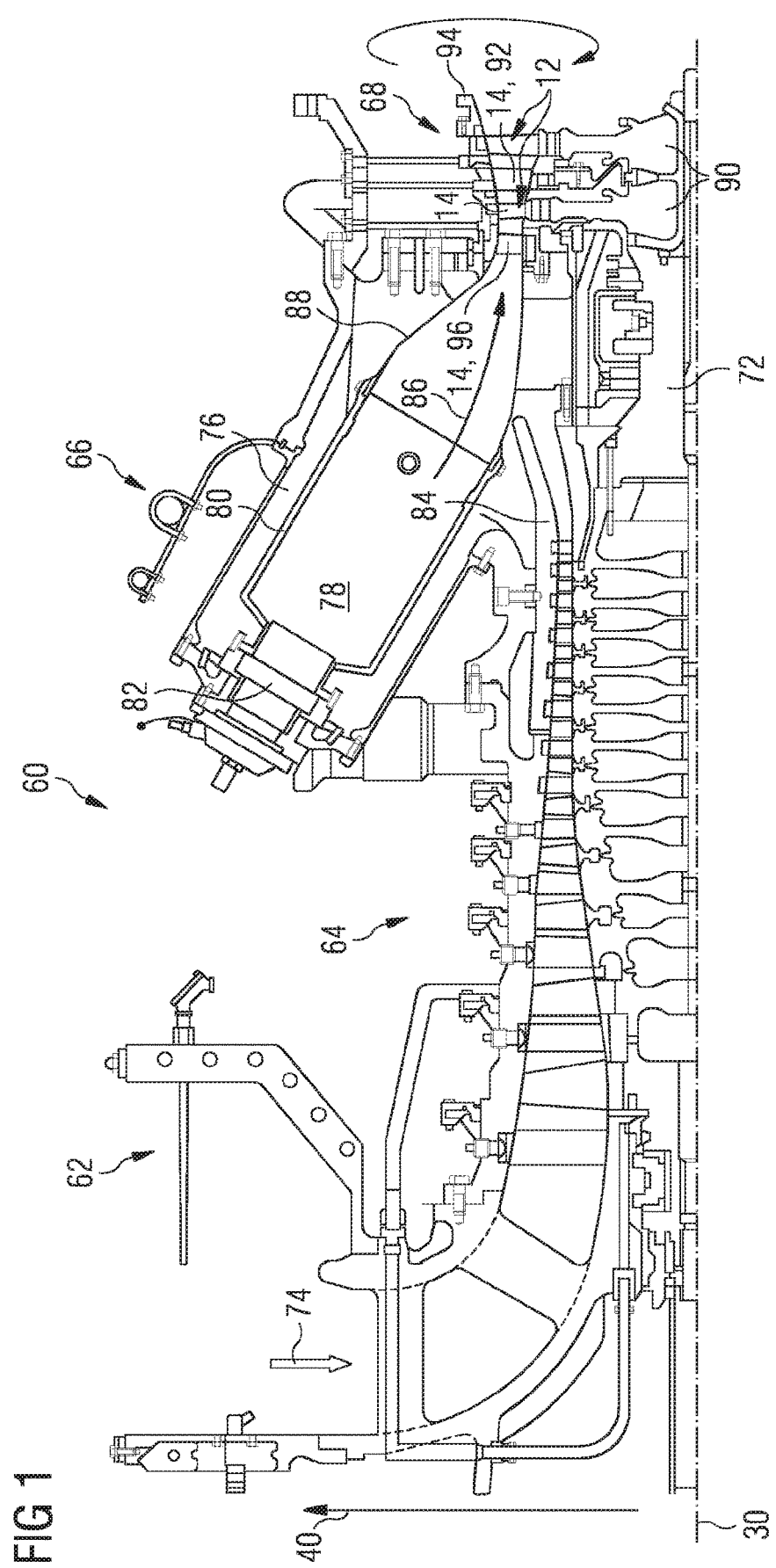
FIG. 1 is a schematic representation of an example of a turbomachine.

By way of context, FIG. 1 shows a known arrangement to which features of the present disclosure may be applied.

FIG. 1 shows an example of a gas turbine engine 60 in a sectional view, which illustrates the nature of the rotor and the environment in which it operates. The gas turbine engine 60 comprises, in flow series, an inlet 62, a compressor section 64, a combustion section 66 and a turbine section 68, which are generally arranged in flow series and generally in the direction of a longitudinal or rotational axis 30. The gas turbine engine 60 further comprises a rotor shaft 72 which is rotatable about the rotational axis 30 and which extends longitudinally through the gas turbine engine 60. The rotational axis 30 is normally the rotational axis of an associated gas turbine engine. Hence any reference to "axial", "radial" and "circumferential" directions are with respect to the rotational axis 30. The radial direction 40 is substantially perpendicular to the rotational axis 30, while the circumferential direction is perpendicular to both the rotational axis 30 and the radial direction 40.

The shaft 72 drivingly connects the turbine section 68 to the compressor section 64.

In operation of the gas turbine engine 60, air 74, which is taken in through the air inlet 62 is compressed by the compressor section 64 and delivered to the combustion section or burner section 66. The burner section 66 comprises a burner plenum 76, one or more combustion chambers 78 defined by a double wall can 80 and at least one burner 82 fixed to each combustion chamber 78. The combustion chambers 78 and the burners 82 are located inside the burner plenum 76. The compressed air passing through the compressor section 64 enters a diffuser 84 and is discharged from the diffuser 84 into the burner plenum 76 from where a portion of the air enters the burner 82 and is mixed with a gaseous or liquid fuel. The air/fuel mixture is then burned and the combustion gas 86 or working gas from the combustion is channelled via a transition duct 88 to the turbine section 68.

The turbine section 68 may comprise a number of blade carrying disks 90 or turbine wheels attached to the rotor shaft 72. In the example shown, the turbine section 68 comprises two disks 90 which each carry an annular array of turbine assemblies 12, which each comprises an aerofoil 14 embodied as a turbine blade. Turbine cascades 92 are disposed between the turbine blades. Each turbine cascade 92 carries an annular array of turbine assemblies 12, which each comprising an aerofoil 14 in the form of guiding vanes, which are fixed to a stator of the gas turbine engine 60.

Figure 2:
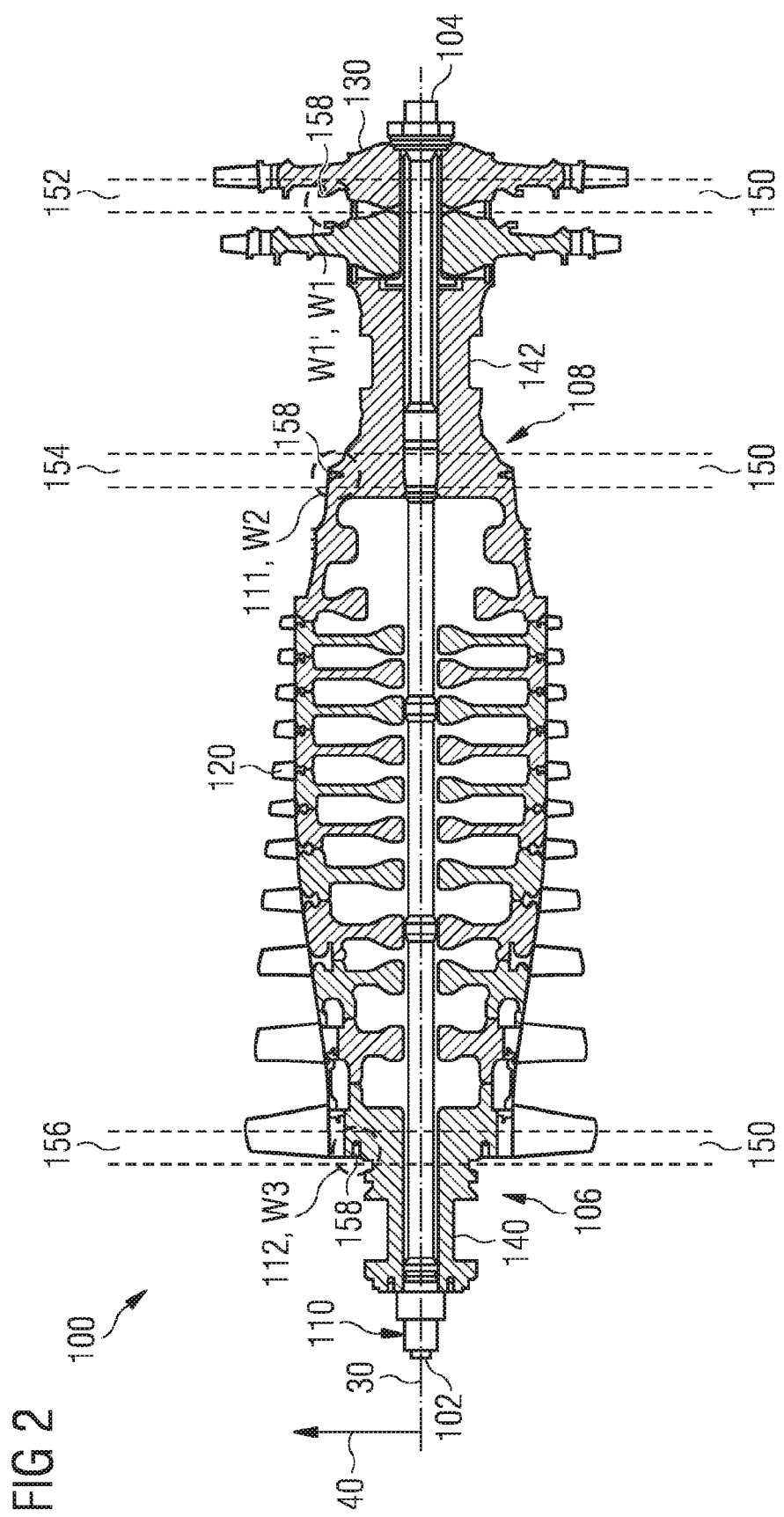
FIG. 2 is a cross-sectional view of a known rotor of a turbomachine.

FIG. 2 is a schematic cross-sectional view of an exemplary rotor 100 to which the rotor balancing method according to the present disclosure may be applied.

The rotor 100 (or 'rotor assembly') has an elongate shape. For example, the rotor assembly of the gas turbine of FIG. 1 comprises the generally cylindrical rotor shaft 72 carrying a plurality of turbine disks and compressor disks 90. The longitudinal extent of the rotor 100 is bounded by a pair of axial ends 102, 104. The first axial end 102 is an upstream end with respect to the flow of working fluid, while the second axial end 104 is a downstream end.

The rotor 100 comprises an inlet stub shaft 106 and an exit stub shaft 108. The inlet stub shaft 106 is located towards the first end 102, while the exit stub shaft 108 is located towards the second end 104. Further, the rotor 100 comprises a rotor shaft 110 carrying power turbine rotor disks 120 and compressor turbine rotor disks 130. The rotor disks 120, 130 are carried on the rotor shaft 110.

The rotor 100 comprises a pair of bearings 140, 142. The bearings (or 'bearing portions' or 'lands') are configured to be received within bearing housings of the gas turbine. According to the present example, each bearing 140, 142 comprises a smooth radial surface coaxially arranged about the rotational axis 30. By means of the bearings the rotor 100 is radially located and supported against forces in the radial direction 40. Such forces include the rotor weight as well dynamic forces, particularly those resulting from an unbalance of the rotor 100.

A plurality of correction planes 150 is provided on the rotor 100 by means of which the unbalance of the rotor 100 may be reduced. In line with its use in the art, the term 'correction plane' is understood to refer to a structural feature of the rotor rather than a geometric plane. In other words, a correction plane is a region or segment of the rotor 100. The plurality of correction planes 150 is configured to selectively receive and retain additional mass so that the mass distribution of the rotor 100 can be altered through the addition of said additional mass. That is to say, each correction plane 150 is configured to receive and retain weights in holes 158 (or 'recesses') defined by the rotor 100.

The plurality of correction planes 150 is spaced apart along the rotational axis 30. Thus means are provided for adjusting the mass distribution at each axial location where a correction plane is located. In certain known rotors, correction planes are located where the rotor designs allows rather than where it would be desirable. That to say, because of design limitations the correction planes are located where it is structurally possible to provide them, but not necessarily in regions which provide the maximal response to balancing adjustment. Furthermore, some correction planes may be difficult to access because other structures of the rotor may obstruct access thereto. It is therefore considered desirable to optimise efficacy of the available correction planes.

According to the present example, there is provided a first correction plane 152, a second correction plane 154, and a third correction plane 156. The first correction plane 152 is provided on a compressor turbine rotor disk 130. The second correction plane 154 is provided on the exit stub shaft 108. The third correction plane 156 is provided on the inlet stub shaft 106.

Each correction plane 150 comprises a plurality of holes 158, where each plurality of holes 158 is arranged symmetrically about the rotational axis 30. The holes 158 of a correction plane 150 are provided at a regular interval, i.e. equidistant angular separation, and at a fixed radial distance to the rotational axis 30. Each hole 158 of a given correction plane 152, 154, 156 therefore has a particular angular location. This particular angular location may be used to identify a specific hole 158 of a specific correction plane 152, 154, 156.

According to some examples, a correction plane 150 comprises between sixteen and twenty holes 158. According to the present example, twenty holes 158 are provided, resulting in an angular separation between adjacent holes 158 of 18° (degrees of an arc) or, equivalently, pi/10 rad (radians). A weight can be fitted into each hole in order to change the mass distribution of the rotor 100 purposes of balancing the rotor 100.

Figure 3:
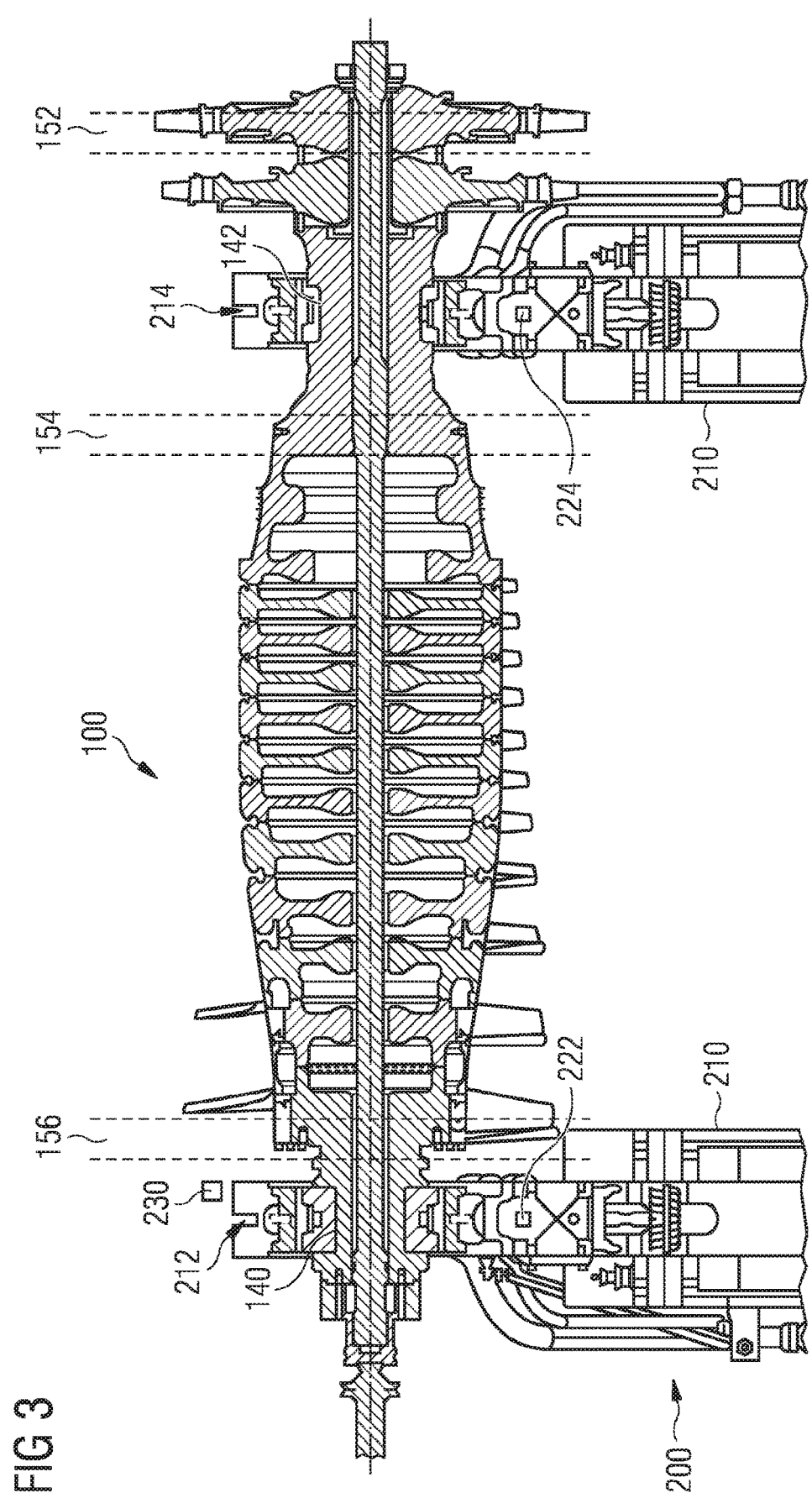
FIG. 3 is partial cross-sectional view of a balancing machine according to the present disclosure and the known rotor shown in FIG. 2.

FIG. 3 is a schematic cross-sectional view of the rotor 100 and a balancing machine 200. The balancing machine 200 is a piece of test equipment configured to simulate operation of the rotor 100 in a gas turbine and assess the performance of the rotor 100 under such operating conditions.

The rotor 100 is mountable onto the balancing machine 200 by means of a plurality of pedestals 210. The pedestals 210 are configured to carry the rotor 100 by receiving and retaining the bearings 140, 142. According to the present example, there is provided a first pedestal 212 and a second pedestal 214. The first pedestal 212 is configured to receive the first bearing 140, while the second pedestal 214 is configured to receive the second bearing 142.

The balancing machine 200 is configured to subject the rotor 100 mounted thereto to a rotational speed corresponding to an intended balance speed. The intended balance speed is a predetermined rotational speed which, according to some examples, corresponds to an operating speed of the rotor 100. For purposes of high-speed balancing the balancing machine 200 may be configured to subject the rotor 100 to a rotational speed at or around the first critical speed of the rotor 100 at which the first bending mode of the rotor becomes significant for balancing considerations.

The balancing machine 200 comprises a plurality of vibration sensors. According to the present example, there is provided a first vibration sensor 222, and a second vibration sensor 224. The first vibration sensor 222 is located at the first pedestal 212 and configured to measure vibrations to which the first pedestal 212 is subjected. Similarly, the second vibration sensor 224 is located at the second pedestal 214 and configured to measure vibrations to which the second pedestal 214 is subjected. Such vibrations may be caused at either or at both pedestals 212, 214 by unbalance of the rotor 100.

The balancing machine 200 comprises a phase sensor 230 configured to detect the revolutions of the rotor 100. According to some examples, the phase sensor 230 is an optical sensor configured to register the revolutions of a visible feature on the rotor 100, such as a mark applied to the surface of the rotor 100. Using the phase sensor 230, the phase of the rotor 100, i.e. its orientation, may be determined.

FIG. 4 illustrates an exemplary method of balancing the rotor 100 using the balancing machine 200. The exemplary method comprises steps S300 to S370 which are carried out in sequence.

More particularly, the method comprises steps S300 to S320 according to which the rotor 100 is set up for balancing. According to steps S300 and S310, there is provided the rotor 100 and the rotor 100 is mounted to the pair of pedestals 212 by receiving the first bearing 140 on the first pedestal 212 and the second baring 142 on the second pedestal 214, as described above in relation to the balancing machine 200.

The method further comprises performing steps S330 to S370 according to which an unbalance of the rotor 100 is assessed and balancing carried out. More particularly, the method comprises step S330 of performing a base run. The base run is performed by running the rotor 100 at the intended balance speed and measuring the vibrations at the first pedestal 212. According to some examples, the vibrations at the second pedestal 214 are measured as well.

Any vibrations detected at the first pedestal 212 are assessed and it is determined whether and to which extent these vibrations are caused as a result of unbalance of the rotor 100. According to the present example, the only cause of vibrations is unbalance of the rotor 100.

A base set of vibration measurements O (or 'original vibration measurement) comprises a first vibration signal O1 of vibrations recorded at the first pedestal 212 and, where recorded, a second vibration signal O2 recorded at the second pedestal 214. Each vibration signal O1, O2 contains information about the magnitude of the vibrations and the phase of the vibrations at the respective pedestal 212, 214. In other words, a vibration signal contains information about a phasor.

The method comprises step 340 of carrying out partial balancing of the rotor 100. By means of partial balancing the rotor 100 is balanced dependent on the vibrations measured at a single pedestal only. This procedure is therefore 'partial' in the sense that any vibrations at the other pedestal are not taken into account for the purposes of partial balancing. According to the present example, partial balancing is performed in relation to vibrations detected at the first pedestal 212 and uses the first correction plane 152. More generally, a different pedestal and/or a different correction plane could have been selected. In later sections of the present disclosure exemplary procedures are set out for selecting a pedestal and, similarly, selecting a correction plane suitable for reducing vibrations at the selected pedestal.

Partial balancing is carried out by fitting (or 'attaching') a first balancing weight W1 to the first correction plane in order to reduce vibrations at the first pedestal, according to the present example to below or around 1 mm/s (millimetres per second). The first balancing weight is generally characterised by its mass and its angular position on the correction plane to which it is fitted. The mass and angular position of the first balancing weight may be determined using any suitable means. According to the present example, the mass and the angular position of the first balancing weight W1 are determined using the vibration measurement O and a first reference influence vector H1'. The first reference influence vector H1' is an influence vector of the first correction plane 152 of a reference rotor 100 of the same production type (or product line) as the rotor 100. For a correction plane of the rotor 100, particularly for a sensitive correction plane, a reference influence vector H1' of a rotor of the same production type may be a suitable approximation of actual influence vector H1. The first balancing weight W1 remains fitted for the subsequently performed first influence run and second influence run.

The method comprises step of 350 of performing a first influence run. In practice, partial balancing and the first influence run carried out together, i.e. define a single step so that the total number of influence runs is not increased. The first influence run is performed by running the rotor 100 at the intended balance speed and measuring the vibrations at the first pedestal 212 and the second pedestal 214. The vibration measurements of the first influence run reflect the effect that the first balancing weight W1 has on the vibrations of the rotor 100 and, hence, its unbalance. It is expected that typically the first balancing weight W1 will significantly reduce the vibrations at the first pedestal 212 and it may also have an effect on vibrations at the second pedestal 214. These vibration measurements are recorded as a first set of vibration measurements R comprising a first vibration signal R1 of vibrations recorded at the first pedestal 212 and a second vibration signal R2 recorded at the second pedestal 214. Each vibration signal R1, R2 contains information about the magnitude of the vibrations and the phase of the vibrations at the respective pedestal. As a result of the first influence run the actual influence vector H1 is calculated from vibration measurement R, base run vibration measurement O and the first balancing weight W1. The actual first influence vector H1 is a vector quantity which describes the effect that a weight added to the first correction plane has on the vibrations detected at the pedestals 210. In particular, a first component H11 of the first influence vector H1 describes the effect on vibrations at the first pedestal 212, and a second component H12 describes the effect on vibrations at the second pedestals 214. Each component has a magnitude and a phase, i.e. defines a phasor. The influence vector H1 is determined by any suitable means, and in later sections at least some means are described.

The method comprises step 360 of performing a second influence run. The second influence run comprises fitting a first calibration weight M1 to the second correction plane 154, running the rotor 100 at the intended balance speed and measuring the vibrations at the first pedestal 212 and the second pedestal 214, and removing the first calibration weight M1. The vibrations are recorded in a second set of vibration measurements P comprising a first vibration signal P1 of the first pedestal 212 and a second vibration signal P2 of the second pedestal 214. As above, each vibration signal contains information about the magnitude of the vibrations and the phase of the vibrations at the respective pedestal. As a result of the first influence run the actual influence vector H2 is calculated from vibration measurement P, vibration measurement R and the first balancing weight M1.

Generally, a calibration weight is a test mass which is added to a correction plane 150 of the rotor 100 in order to determine the effect of the test mass on the vibrations of the rotor 100 at the pedestals 210 in order to infer the effect a balancing weight will have. Only a single calibration weight is added to the rotor 100 at any given time in order to determine the response of a particular correction plane, i.e. the plane to which the calibration weight is added.

The method comprises step 370 of carrying out final balancing of the rotor 100. Final balancing comprises fitting a final balancing weight W1' to the first correction plane 152 and a second balancing weight W2 to the second correction plane 154 dependent on the vibrations measured as part of the first influence run and the second influence run. In other words, final balancing is carried out in view of the actual first influence vector H1, the actual second influence vector H2 and partial vibration measurements R with the intention of reducing the vibrations remaining after partial balancing has been performed in the earlier step S340.

The final balancing weight W1' is added to the first correction plane 152 in addition to the first balancing weight W1 or, alternatively, is added to the first correction plane 152 and the first balancing weight W1 is removed. It is therefore called 'final' balancing weight with reference to the final balancing performed using the first correction plane 152, as opposed to the partial balancing performed in an earlier step using the first correction plane 152. However, the final balancing weight W1' may alternatively be referred to as another balancing weight.

The mass and the angular location of the final balancing weight W1' and the second balancing weight W2 may be determined using any suitable means, and in later sections of the present disclosure a particular example is discussed.

According to some examples, the method comprises providing a data set containing reference vibration measurements taken during balancing of at least one reference rotor 100 of the same production type as the rotor 100, or at least one reference influence vector H1'. The reference influence vector H1' is an influence vector of the first correction plane 152 of the reference rotor 100 which is being used to approximate an actual influence vector H1 of the rotor 100 undergoing balancing. The reference influence vector H1' is calculated from the reference vibration measurements. Where the reference vibration measurements are contained in the data set but no reference influence vector H1' is provided, the reference influence vector H1' can be calculated from the reference vibration measurements.

The rotor 100 and the reference rotor 100 are of the same production line, i.e. product type, and hence substantially identical. In particular, the first reference correction plane 152 of the reference rotor 100 corresponds to the first correction plane 152 of the rotor 100. Using the influence vector of a reference rotor 100, i.e. a reference influence vector, to approximate an actual influence vector of the rotor has been found to optimise the mass and angular location values of the first balancing weight W1 fitted to the rotor 100. Notably, the vibration response of certain known rotors has been found to critically depend on the mass and angular location values. A set of randomly selected values may therefore yield a poor vibration response and, ultimately, an ineffective balancing weight.

The data set is used to determine the mass and the angular location of the first balancing weight W1. More particularly, the first balancing weight W1 has a mass and an angular location which is determined dependent on the base set of vibration measurements O and the first reference influence vector H1'. According to the present example, the first reference influence vector H1' is determined with reference to the data set. The data set comprises either the reference influence vector H1' or allows the reference influence vector H1' to be calculated from the reference vibration measurements. That is to say, the reference influence vector H1' describes the effect of a balancing weight on the first calibration plane of the reference rotor 100 and it is assumed that the first calibration plane 152 of the rotor 100 is described by the same influence vector.

Where the data set contains measurements relating to a plurality of reference rotors 100 or a plurality of reference influence vectors H1', an average influence vector may be calculated. The average influence vector has a magnitude corresponding to the average of the magnitude of the reference influence vectors, and a phase corresponding to the average of the phase of the reference influence vectors H1'.

The mass and the angular location of the first balancing weight W1 are approximated using the reference influence vector H1', which is calculated according to:

$$W1 = -O1/H11', \qquad \text{(Equation 1)}$$

i.e. W1 equals minus O1 divided by H11'. According to the above Equation 1, the balancing weight is expressed as a vector function of mass and angular location. The mass is expressible in units grams, while the angular location is expressible in units of degrees of an arc. The vibration response O1 depends on the amplitude of the vibrations, expressible in millimetres per second, and the phase angle of the vibrations, expressible in degrees of an arc. The influence vector possesses a magnitude, expressible in units of millimetres per second per gram, and a phase angle, expressible in degrees of an arc.

In accordance with the art, division is understood to mean the division of the magnitudes and the difference of the phases. Accordingly, the calculation of W1 comprises dividing the magnitude of O1 by the magnitude of H11, and calculating the difference in phase between O1 and H11.

Approximating the first influence vector H1 with reference to reference rotors 100 may be a particularly accurate approximation where the correction plane 150 is a sensitive correction plane. A sensitive correction plane 150 is described by an influence vector having a relatively large magnitude, wherein said magnitude is consistent across rotors of the same production type. Moreover, the phase of the influence vector of a sensitive correction plane is also consistent across rotors of the same production type.

Using the data set containing information about at least one rotor of the same production type it is possible to identify a sensitive correction plane. For example, according to the present example the reference influence vector H1', which is either contained in the data set or can be calculated therefrom, has a magnitude which is greater than the magnitude of a second reference influence vector H2' of the second correction plane 154. The second reference influence vector H2' is an influence vector of the second correction plane 154 of the at least one reference rotor 100. The second correction plane 154 of the reference rotor 100 corresponds to the second correction plane 154 of the rotor 100, i.e. they are the 'same' correction plane.

According to some examples, the magnitude of the first reference influence vector H1' is greater than the magnitude of the second reference influence vector H2' by at least a factor of two. According to other examples, by at least a factor of five. According to yet further examples, by at least a factor of ten.

It has been found that for certain rotors one of the pedestals is easier to balance than the other pedestal. Technically this may be reflected in that the determination of the angular location of a balancing weight is more accurate for the one pedestal than for the other pedestal. Where reference influence vectors are used in making said determination, a small statistical spread in the phase of the reference influence vectors is desirable. According to such examples, the data set contains a plurality of reference influence vectors H1', H2' of the first correction plane 152 and of the second correction plane 154 of a plurality of reference rotors 100. The method comprises selecting the first pedestal 212 for partial balancing after determining that the phase of the plurality of first reference influence vectors H1' has a smaller spread than the phase of the reference influence vectors H2'. The statistical spread of the phase may be calculated using any suitable means such as, for example, the variance or the standard deviation. According to some examples, the method comprises selecting the first pedestal (212) of the rotor (100) for partial balancing after determining that the phase of the reference influence vectors of the second correction plane (154) of the reference rotors (100) with respect to the first pedestal (212) has a greater statistical spread than the phase of the reference influence vectors of the second correction plane (154) with respect to the second pedestal (214) of the reference rotors (100).

According to some examples, both components of H1' possess a smaller spread of the phase than both components of the phase of H2'. That is to say, for both pedestals 212, 214 the effect of a balancing weight on vibrations at the first pedestal 212 and the second pedestal 214 is more accurately determinable using the first correction plane 152, as described by H1', than for the second correction plane 154, as described by H2'.

It has been found that for certain rotors both pedestals are approximately equally difficult to balance. That is to say, technically the spread of the phases of the reference influence vectors is about equal. In such a case it is desirable to balance the rotor 100 by selecting the pedestal subjected to greater vibrations. According to such examples, the data set contains reference influence vectors of a first correction plane 152 and a second correction plane 154 of a plurality of reference rotors 100; and wherein the method comprises selecting the first pedestal 212 of the rotor 100 for partial balancing by: determining that the phase of the reference influence vectors of the first pedestals 212 of the reference rotors 100 has a spread which is approximately equal to the spread of the phase of the reference influence vectors of the second pedestals 214 of the reference rotors 100, and determining that greater vibrations are detected at the first pedestal 212 than at the second pedestal 214 as part of the vibration measurements of the base run of the rotor 100.

According to some examples, the method as described above is sufficient for meeting a tolerance for vibrations, for example as set by an applicable standard. According to other examples, it is desirable to further reduce vibrations at the pedestals. Suitably, the method comprises performing a third influence run after to the second influence run. The third influence run comprises fitting a second calibration weight M2 to the third correction plane 156, running the rotor 100 at the intended balance speed and measuring the vibrations at the first pedestal 212 and/or the second pedestal 214, and removing the second calibration weight M2, and wherein the third influence vector H3 is derived through the same procedure as used for deriving H2. Carrying out final balancing of the rotor 100 comprises fitting a final balancing weight W1' to the first correction plane 152, a second balancing weight W2 to the second correction plane 154 and a third balancing weight W3 to the third correction plane 156 dependent on vibrations measured as part of the partial balance run (the first influence run), the second influence run and the third influence run.

The masses and the angular locations of the balancing weights W1', W2 and W3 may be calculated numerically using following equations.

In the final balance run, the total vibration V from the residual unbalance at the first pedestal 212 and the second pedestal 214 may be given by the equation:

$$V(W_i)_{i=1\ to\ 3,} = R + \Sigma(H_i W_i)_{i=1\ to\ 3} \quad \text{(Equation 2)},$$

i.e. V, which is dependent on the balancing weights W1', W2, and W3, equals R plus the sum over the products of each balancing weight and its corresponding influence vector. Through a nonlinear system optimization numerical approach, the balancing weights weights W1', W2 and W3 are calculated to satisfy:

$$V(W_i)_{i=1\ to\ 3} \to 0 \quad \text{(Equation 3)},$$

i.e. the total vibrations V, which are dependent on the balancing weights W1', W2, and W3, tend to zero.

According to the present example, the method as described above is provided on a computer-readable medium, such as a hard disk or an optical disc. That is to say, instructions for carrying out the above method, particularly with reference to steps S300 to S370, are provided on the computer-readable medium. For example, using a suitable programming language a software application may be provided for performing the method. More particularly, the computer-readable medium may be configured to instruct a processing unit to carry out certain steps of the method, and may be configured to instruct an operator to carry out other steps of the method. For example, the steps S300, S310, S320 may be carried out by the operator. Other steps that may be carried out by the operator include the fitting of the weights.

The computer-readable medium may also contain the data set, thus providing the software application with access thereto, in order to perform some steps of the method. According to some examples, the computer-readable medium is configured to instruct a processing unit, such as a central processing unit, to calculate the mass and the angular location of the first balancing weight W1 using the data set.

The computer-readable medium may be part of the balancing machine 200. That is to say, the balancing machine 200 comprises the computer-readable medium.

The example rotor 100 discussed above comprises two bearings 140, 142. More generally, a rotor with any number of bearings may be balanced using the present disclosure. For example, such a rotor may comprise three or more bearings.

The example rotor 100 discussed above comprises three correction planes 150. More generally, a rotor with any number of correction planes may be balanced using the present disclosure. For example, such a rotor may comprise three or more correction planes.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A rotor balancing method for a gas turbine, the method comprising:
    providing a rotor comprising: a first bearing and a second bearing, and a plurality of correction planes comprising a first correction plane and a second correction plane;
    mounting the rotor for balancing by receiving the first bearing on a first pedestal and the second bearing on a second pedestal;
    performing a base run by: running the rotor at an intended balance speed and measuring vibrations at the first pedestal;
    carrying out partial balancing and a first influence run of the rotor by: fitting a first balancing weight to the first correction plane in order to reduce vibrations at the first pedestal, running the rotor at the intended balance speed and measuring the vibrations at the first pedestal and the second pedestal; leaving the first balancing weight fitted for all following influence runs;
    performing a second influence run by: fitting a first calibration weight to the second correction plane, running the rotor at the intended balance speed and measuring the vibrations at the first pedestal and the second pedestal, and removing the first calibration weight;
    carrying out final balancing of the rotor by: fitting a final balancing weight to the first correction plane and a second balancing weight to the second correction plane dependent on the vibrations measured as part of the first influence run and the second influence run;
    providing a data set containing: reference vibration measurements taken during balancing of at least one reference rotor that is the same as the rotor, or at least a first reference influence vector of the first correction plane, wherein the reference influence vector is an influence vector of the first correction plane of the at least one reference rotor:
    wherein fitting the first balancing weight comprises using the data set to determine a mass and an angular position of the first balancing weight to reduce vibrations at the first pedestal;
    wherein a magnitude of the first reference influence vector is greater than the magnitude of a second reference influence vector of the second correction plane, wherein the second reference influence vector is an influence vector of the second correction plane of the reference rotor, and wherein the second reference influence vector is either contained in the data set or computable from the vibration measurements of the data set; and
    wherein the final balancing weight is in addition to the first balancing weight or is added to the first correction plane and the first balancing weight is removed.

2. The method according to claim 1,
    wherein the final balancing weight is fitted to the first correction plane in addition to the first balancing weight.

3. The method according to claim 1,
    wherein the final balancing weight is fitted to the first correction plane and the first balancing weight is removed from the first correction plane as part of the final balancing of the rotor.

4. The method according to claim 1, the method comprising:
    performing a third influence run, subsequent to the second influence run, by:
    fitting a second calibration weight to a third correction plane, running the rotor at the intended balance speed and measuring the vibrations at the first pedestal and/or the second pedestal, and removing the second calibration weight; and
    wherein fitting the final balancing weight and the second balancing weight as part of carrying out final balancing of the rotor also comprises fitting a third balancing weight to the third correction plane dependent on vibrations measured as part of the first influence run, the second influence run and the third influence run.

5. The method according to claim 1,
    wherein the intended balance speed is a full operational speed at a first speed of the rotor at which a mode shape of the rotor is formed.

6. A rotor balancing method for a gas turbine, the method comprising:
    providing a rotor comprising: a first bearing and a second bearing, and a plurality of correction planes comprising a first correction plane and a second correction plane;
    mounting the rotor for balancing by receiving the first bearing on a first pedestal and the second bearing on a second pedestal;

performing a base run by: running the rotor at an intended balance speed and measuring vibrations at the first pedestal;

carrying out partial balancing and a first influence run of the rotor by: fitting a first balancing weight to the first correction plane in order to reduce vibrations at the first pedestal, running the rotor at the intended balance speed and measuring the vibrations at the first pedestal and the second pedestal; leaving the first balancing weight fitted for all following influence runs;

performing a second influence run by: fitting a first calibration weight to the second correction plane, running the rotor at the intended balance speed and measuring the vibrations at the first pedestal and the second pedestal, and removing the first calibration weight;

carrying out final balancing of the rotor by: fitting a final balancing weight to the first correction plane and a second balancing weight to the second correction plane dependent on the vibrations measured as part of the first influence run and the second influence run;

providing a data set containing: reference vibration measurements taken during balancing of at least one reference rotor that is the same as the rotor, or at least a first reference influence vector of the first correction plane, wherein the reference influence vector is an influence vector of the first correction plane of the at least one reference rotor;

wherein fitting the first balancing weight comprises using the data set to determine a mass and an angular position of the first balancing weight to reduce vibrations at the first pedestal;

wherein a magnitude of the first reference influence vector is greater than the magnitude of a second reference influence vector of the second correction plane, wherein the second reference influence vector is an influence vector of the second correction plane of the reference rotor, and wherein the second reference influence vector is either contained in the data set or computable from the vibration measurements of the data set; and wherein the data set contains reference influence vectors of a first correction plane and a second correction plane of a plurality of reference rotors; and wherein the method comprises selecting the first pedestal of the rotor for partial balancing after determining that a phase of the reference influence vectors of the first correction plane of the reference rotors has a smaller statistical spread than a phase of the reference influence vectors of the second correction plane of the reference rotors.

7. A rotor balancing method for a gas turbine, the method comprising:

providing a rotor comprising: a first bearing and a second bearing, and a plurality of correction planes comprising a first correction plane and a second correction plane;

mounting the rotor for balancing by receiving the first bearing on a first pedestal and the second bearing on a second pedestal;

performing a base run by: running the rotor at an intended balance speed and measuring vibrations at the first pedestal;

carrying out partial balancing and a first influence run of the rotor by: fitting a first balancing weight to the first correction plane in order to reduce vibrations at the first pedestal, running the rotor at the intended balance speed and measuring the vibrations at the first pedestal and the second pedestal; leaving the first balancing weight fitted for all following influence runs;

performing a second influence run by: fitting a first calibration weight to the second correction plane, running the rotor at the intended balance speed and measuring the vibrations at the first pedestal and the second pedestal, and removing the first calibration weight;

carrying out final balancing of the rotor by: fitting a final balancing weight to the first correction plane and a second balancing weight to the second correction plane dependent on the vibrations measured as part of the first influence run and the second influence run;

providing a data set containing: reference vibration measurements taken during balancing of at least one reference rotor that is the same as the rotor, or at least a first reference influence vector of the first correction plane, wherein the reference influence vector is an influence vector of the first correction plane of the at least one reference rotor;

wherein fitting the first balancing weight comprises using the data set to determine a mass and an angular position of the first balancing weight to reduce vibrations at the first pedestal;

wherein a magnitude of the first reference influence vector is greater than the magnitude of a second reference influence vector of the second correction plane, wherein the second reference influence vector is an influence vector of the second correction plane of the reference rotor, and wherein the second reference influence vector is either contained in the data set or computable from the vibration measurements of the data set;

wherein the data set contains reference influence vectors of a second correction plane of a plurality of reference rotors; and wherein the method comprises selecting the first pedestal of the rotor for partial balancing after determining that a phase of the reference influence vectors of the second correction plane of the reference rotors with respect to the first pedestal has a greater statistical spread than a phase of the reference influence vectors of the second correction plane with respect to the second pedestal of the reference rotors.

8. A rotor balancing method for a gas turbine, the method comprising:

providing a rotor comprising: a first bearing and a second bearing, and a plurality of correction planes comprising a first correction plane and a second correction plane;

mounting the rotor for balancing by receiving the first bearing on a first pedestal and the second bearing on a second pedestal;

performing a base run by: running the rotor at an intended balance speed and measuring vibrations at the first pedestal;

carrying out partial balancing and a first influence run of the rotor by: fitting a first balancing weight to the first correction plane in order to reduce vibrations at the first pedestal, running the rotor at the intended balance speed and measuring the vibrations at the first pedestal and the second pedestal; leaving the first balancing weight fitted for all following influence runs;

performing a second influence run by: fitting a first calibration weight to the second correction plane, running the rotor at the intended balance speed and measuring the vibrations at the first pedestal and the second pedestal, and removing the first calibration weight;

carrying out final balancing of the rotor by: fitting a final balancing weight to the first correction plane and a second balancing weight to the second correction plane dependent on the vibrations measured as part of the first influence run and the second influence run;

providing a data set containing: reference vibration measurements taken during balancing of at least one reference rotor that is the same as the rotor, or at least a first reference influence vector of the first correction plane, wherein the reference influence vector is an influence vector of the first correction plane of the at least one reference rotor; wherein the data set contains a plurality of reference influence vectors of the second correction plane, wherein the reference influence vectors are influence vectors of a plurality of reference rotors; and wherein the method comprises selecting the first pedestal of the rotor for partial balancing by:

determining that a phase of the reference influence vectors of the first pedestal of the reference rotors has a statistical spread which is approximately equal to the statistical spread of a phase of the reference influence vectors of the second pedestal of the reference rotors, and determining that greater vibrations are detected at the first pedestal than at the second pedestal as part of the vibration measurements of the base run of the rotor.

9. The method according to claim 8, wherein fitting a first balancing weight comprises calculating an average influence vector from the reference influence vectors of the first correction plane for determining a mass and an angular location of the first balancing weight.

10. A non-transitory computer-readable medium for rotor balancing of a rotor comprising a first bearing and a second bearing, and a plurality of correction planes comprising a first correction plane and a second correction plane, wherein the rotor is mounted for balancing by receiving the first bearing on a first pedestal and the second bearing on a second pedestal, the computer-readable medium comprising:

instructions for:

performing a base run by: running the rotor at an intended balance speed and measuring vibrations at the first pedestal;

carrying out partial balancing and a first influence run of the rotor by: fitting a first balancing weight to the first correction plane in order to reduce vibrations at the first pedestal, running the rotor at the intended balance speed and measuring the vibrations at the first pedestal and the second pedestal; leaving the first balancing weight fitted for all following influence runs;

performing a second influence run by: fitting a first calibration weight to the second correction plane, running the rotor at the intended balance speed and measuring the vibrations at the first pedestal and the second pedestal, and removing the first calibration weight;

carrying out final balancing of the rotor by: fitting a final balancing weight to the first correction plane and a second balancing weight to the second correction plane dependent on the vibrations measured as part of the first influence run and the second influence run;

wherein the final balancing weight is in addition to the first balancing weight or is added to the first correction plane and the first balancing weight is removed storing, in a data set, reference vibration measurements taken during balancing of at least one reference rotor that is the same as the rotor, or at least a first reference influence vector of the first correction plane, wherein the reference influence vector is an influence vector of the first correction plane of the at least one reference rotor;

wherein the fitting the first balancing weight comprises using the data set to determine a mass and an angular position of the first balancing weight to reduce vibrations at the first pedestal;

wherein a magnitude of the first reference influence vector is greater than the magnitude of a second reference influence vector of the second correction plane, wherein the second reference influence vector is an influence vector of the second correction plane of the reference rotor, and wherein the second reference influence vector is either contained in the data set or computable from the vibration measurements of the data set; and wherein the final balancing weight is in addition to the first balancing weight or is added to the first correction plane and the first balancing weight is removed.

11. A balancing machine comprising:

a first pedestal and a second pedestal;

the computer-readable medium according to claim 10.

* * * * *